(12) United States Patent
Peisa

(10) Patent No.: US 8,761,135 B2
(45) Date of Patent: Jun. 24, 2014

(54) METHODS AND ARRANGEMENTS IN A WIRELESS TELECOMMUNICATION SYSTEM

(75) Inventor: Janne Peisa, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 12/922,737

(22) PCT Filed: Mar. 15, 2010

(86) PCT No.: PCT/SE2010/050284
§ 371 (c)(1),
(2), (4) Date: Sep. 15, 2010

(87) PCT Pub. No.: WO2010/107374
PCT Pub. Date: Sep. 23, 2010

(65) Prior Publication Data
US 2012/0002648 A1    Jan. 5, 2012

Related U.S. Application Data

(60) Provisional application No. 61/160,466, filed on Mar. 16, 2009.

(51) Int. Cl.
*H04W 4/00*    (2009.01)
(52) U.S. Cl.
USPC .......................................... 370/338

(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–522, 523–520, 521–529
See application file for complete search history.

(56) References Cited

U.S. PATENT DOCUMENTS

| | | | |
|---|---|---|---|
| 2008/0186946 A1* | 8/2008 | Marinier et al. | 370/349 |
| 2009/0175259 A1* | 7/2009 | Lucky | 370/349 |
| 2009/0310537 A1* | 12/2009 | Bucknell et al. | 370/328 |
| 2011/0154144 A1* | 6/2011 | Nanda | 714/748 |

FOREIGN PATENT DOCUMENTS

| | | |
|---|---|---|
| CN | 101098295 A | 1/2008 |
| WO | WO 2007/092887 A2 | 8/2007 |
| WO | WO 2008/073443 A2 | 6/2008 |
| WO | WO 2008/084426 A1 | 7/2008 |

* cited by examiner

*Primary Examiner* — Jung-Jen Liu

(57) ABSTRACT

Using an extended reordering depth in order to avoid TSN reordering window stalling during a stop-and-wait HARQ-process of a multi-carrier operation in the downlink MAC-ehs protocol and in the uplink MAC-i/is protocol. The extended reordering depth corresponds to a reordering depth that is increased from the 32 sequence numbers obtained by a 6 bits TSN field, and it is based on the TSN of a data unit, and this TSN is indicated only in a header of the data unit.

12 Claims, 14 Drawing Sheets

METHODS AND ARRANGEMENTS IN A WIRELESS TELECOMMUNICATION SYSTEM

PRIORITY CLAIM

This application claims the benefit of U.S. Provisional Application No. 61/160,466, filed Mar. 16, 2009, the disclosure of which is fully incorporated herein by reference.

TECHNICAL FIELD

The present invention relates to methods in a user equipment and in a radio base station of a wireless communication system for handling data units of a stop-and-wait HARQ-process in a multi-carrier operation. The invention also relates to a user equipment and a radio base station configured for handling data units of a stop-and-wait HARQ-process in a multi-carrier operation.

BACKGROUND

The Universal Mobile Telecommunication System (UMTS) is a third generation mobile communication technology, which is designed to succeed GSM. The 3GPP Long Term Evolution (LTE) is a project within the $3^{rd}$ Generation Partnership Project (3GPP) to improve the UMTS standard, and provide a higher data rate and an improved efficiency. A UMTS Terrestrial Radio Access Network (UTRAN) is a radio access network of a UMTS, and an evolved UTRAN (E-UTRAN) is a radio access network of an LTE system. As illustrated in FIG. 1, a UTRAN typically comprises a number of user equipments (UE) 13a-c, each UE wirelessly connected to a radio base station (RBS) 14a, 14b, denoted a NodeB, which is wirelessly connected to a Radio Network Controller (RNC) 15, one RNC typically controlling several NodeBs.

Modern wireless communication systems for packet based communication may normally include a hybrid automatic repeat request (HARQ) functionality on the physical layer to achieve robustness against the impairments of the radio channel, and HARQ is available both in the LTE and in the UMTS. The HARQ combines forward error correction coding (FEC) with automatic repeat request (ARQ). In FEC coding, forward error correcting parity bits are computed from the information bits and added prior to transmission, to enable a correction of erroneously received information bits on the receiving side. In an ARQ scheme, the receiver detects whether a received block of information bits is correct or not using an error detection (ED) code, e.g. by a Cyclic Redundancy Check (CRC), and a positive acknowledgement (ACK) is sent to the transmitted if no error is detected. However, if an error is detected, the information is reordered by the receiver sending a negative acknowledgement (NACK) to the transmitter. Upon reception of the negative acknowledgment, the transmitter will retransmit the information.

As mentioned above, the hybrid automatic repeat request (HARQ) is a combination of FEC and ARQ, and it can be used in a selective repeat mode or in a stop-and wait mode. A block of information bits, denoted a transport block (TPB), is encoded, adding both an error-detection code, e.g. the CRC, and FEC parity bits. In a stop-and-wait HARQ, a received encoded block is decoded, and the ED-code and the FEC parity bits are used to check whether the decoding was successful or not, a successful decoding indicating that the information had been transmitted and received correctly. If the block of information is received without errors, an ACK is sent to the transmitter indicating that the transmission was successful and that the receiver is ready for a new block. On the other hand, if the block of information bits was not decoded correctly, the receiver reorders the information by sending a NACK to the transmitter, indicating that the receiver is expecting a retransmission of the same block.

A further improvement is HARQ with soft-combining, which combines the retransmissions with soft-combining functionality, according to which the receiver does not discard erroneously received blocks of information bits. Instead, it buffers their soft-bit values and combines these values with the soft-bit values of the received retransmitted blocks.

Multi-antenna techniques can increase the data rates and reliability of a wireless communication system significantly, and the performance is improved if both the transmitter and the receiver are equipped with multiple antennas. This will result in a multiple-input multiple-output (MIMO) radio communication channel, and such systems and related techniques are commonly referred to as MIMO. In a MIMO-operation or in a multi-cell operation, multiple simultaneous and independent stop-and-wait HARQ processes may take place, which leads to a better resource utilization.

The current MAC-hs, MAC-ehs, MAC-es and MAC-is protocols are all based on multiple independent stop-and-wait HARQ processes, and in the High Speed Packet Access (HSPA), the MAC-hs/ehs protocols handle the HS-DSCH (High Speed Downlink Shared Channel) and the MAC-es/is protocols handle the uplink E-DCH (Enhanced Dedicated Transport Channel). A successful reception of reordered and retransmitted transport blocks from different HARQ processes may occur at a different order than the initial, original transmission of the transport block, since a different number of retransmission may have been required before the successful reception, which could result in that data is delivered out-of-order to higher layers.

For this reason, the above-mentioned protocols all include a transmission sequence number (TSN) to enable a correct delivery of reordered data units to higher layers, by indicating the original and initial transmission order of the received reordered data units. The reordering procedure is standardized according to the current downlink MAC-hs and MAC-ehs protocols, but implemented by the network according to the uplink MAC-es and MAC-is protocols.

The size of the TSN-field for indicating the TSN is 6 bits in the conventional MAC-hs, MAC-ehs, MAC-es and MAC-is protocols. A field comprising 6 bits, each bit indicating 0 or 1, enables the field to indicate a digital number ranging between 0 and 31, thereby allowing a TSN reordering window of 32 transmission sequence numbers. However, for 1.28 Mcps TDD multi-frequency HS-DSCH operation mode, it is possible to include a field accommodating three additional bits, which is inserted in the payload at the end of a MAC-hs PDU Protocol Data Unit (PDU), possibly instead of the padding.

FIG. 2 illustrates such a conventional MAC-hs PDU Protocol Data Unit (PDU), for 1.28 Mcps TDD multi-frequency HS-DSCH operation mode, indicating the MAC-hs header 21, the payload 22, the 6 bit TSN field 23 located in the header 21, as well as the optional added extended three bit TSN field 24 located in the payload, before the padding.

As explained above, a TSN-field size of 6 bits gives a TSN reordering window that accommodates 32 transmission sequence numbers, i.e. a so-called reordering depth of 32. This may be sufficient to support up to three retransmissions before the TSN reordering window stalls, if two MAC PDUs with different TSN are transmitted per TTI (Time Transmission Interval), and this could occur either at MIMO or at dual cell operation with MAC-ehs. However, if more than two MAC PDUs are transmitted per TTI with different TSNs, the number of possible retransmissions before TSN reordering window stalling is reduced, and with Dual Cell operation with MIMO, TSN reordering window stalling will take place at the first retransmission.

This situation is illustrated in FIG. 3, indicating four MAC PDUs 31 transmitted per TTI for a dual-operation of Cell 1 and Cell 2, i.e. four active HARQ processes per TTI. At unmodified UE processing requirements, up to 24 HARQ processes could be used during one RTT (Round-Trip Time), which will consume up to 24 TSNs per one HARQ RTT, of the available 32 transmission sequence numbers. Consequently, already the first retransmission will result in the occurrence of TSN reordering window stalling.

Thereby, a continuous operation could be maintained with the 6 bit TSN-field, allowing a TSN reordering window 32, but a single retransmission may lead to TSN reordering window stalling.

If more than two carriers are used, the TSN shortage will be even more severe, and could lead to a situation where even continuous operation is not possible.

Further, it is not possible to use the MAC-hs PDU format defined for 1.28 Mcps TDD multi-frequency HS-DSCH operation mode, as illustrated in FIG. 2, since the dual cell operation and MIMO are only supported by MAC-ehs, which is octet aligned. Furthermore, the 1.28 Mcps TDD multi-frequency HS-DSCH operation mode MAC-hs PDU format is complicated to process, since the three additional and least significant bits of the extended TSN field are located at the end of the payload, before the padding, and are only available after the processing of the MAC-hs header.

SUMMARY

The object of the present invention is to address the problem outlined above, and this object and others are achieved by the method and the arrangement according to the appended independent claims, and by the embodiments according to the dependent claims.

According to one aspect, the invention provides a method in a user equipment of a wireless communication system for handling received data units of a stop-and-wait HARQ-process in a multi-carrier operation. The method comprises the following steps, performed by the UE:
  Receiving two or more Medium Access Control-ehs, MAC-ehs, data units from a radio base station;
  Identifying a Transmission Sequence Number, TSN, of each MAC-ehs data unit, said TSN being indicated only in a header; and
  Determining the original transmission order of the two or more received data units using an extended reordering depth, the extended reordering depth being increased compared to the reordering depth of a 6 bit TSN-field, and being based on said identified TSN of each received MAC-ehs data unit.

According to a second aspect, the invention provides a method in a user equipment of a wireless communication system for transmitting data units of a stop-and-wait HARQ-process in a multi-carrier operation. The method comprises the following steps, performed by the UE:
  Indicating the Transmission Sequence Number, TSN, only in a MAC-is header of a MAC-i/is data unit, wherein the original transmission order of two or more data units is indicated by an extended reordering depth, the extended reordering depth being increased compared to the reordering depth of a 6 bit TSN-field, and being based on said indicated TSN, and
  Transmitting the MAC-i/is data unit to a radio base station.

According to a third aspect, the invention provides a method in a radio base station of a wireless communication system for handling received data units of a stop-and-wait HARQ-process in a multi-carrier operation. The method comprises the following steps, performed by the radio base station:
  Receiving two or more MAC-i/is data units from a user equipment;
  Identifying the Transmission Sequence Number, TSN, of each of the received MAC-i/is data units, said TSN being indicated only in a MAC-is header; and
  Determining the original transmission order of said two or more received data units using an extended, reordering depth, the extended reordering depth being increased compared to the reordering depth of a 6 bit TSN-field, and being based on said identified TSN.

According to a fourth aspect, the invention provides a method in a radio base station of a wireless communication system for transmitting data units in a stop-and-wait HARQ-process of a multi-carrier operation. The method comprises the following steps, performed by the radio base station:
  Indicating a Transmission Sequence Number, TSN, only in a header of two or more MAC-ehs data units, wherein the original transmission order of the two or more data units is indicated by an extended reordering depth, the extended reordering depth being increased compared to the reordering depth of a 6 bit TSN-field, and being based on the indicated TSN, and
  Transmitting the MAC-ehs data units to a user equipment.

According to a fifth aspect, the invention provides a user equipment, UE, for a wireless communication system, the UE configured to handle data units received from a radio base station in a stop-and-wait HARQ-process of a multi-carrier operation. The UE comprises:
  A MAC-ehs receiver configured to receive MAC-ehs data units;
  A TSN identifying unit configured to identify the Transmission Sequence Number, TSN, of a received MAC-ehs data unit, said TSN indicated only in a header; and
  A determining unit configured to determine the original transmission order of two or more received MAC-ehs data units from an extended reordering depth, the extended reordering depth being increased compared to a reordering depth of a 6 bit TSN-field, and being based on the identified TSN of the received MAC-ehs data units.

According to a sixth aspect, the invention provides a user equipment, UE, for a wireless communication system, the UE configured to transmit data units to a radio base station in a stop-and-wait HARQ-process of a multi-carrier operation. The UE comprises:
  A TSN indicating unit configured to indicate the original transmission order of two or more MAC-i/is data units, using an extended reordering depth, the extended reordering depth being increased compared to the reordering depth of a 6 bit TSN-field, and being based on a TSN indicated only in a MAC-is header of a MAC-i/is data unit.
  A MAC-i/is transmitter configured to transmit MAC-i/is data units.

According to a seventh aspect, the invention provides a radio base station, RBS, for a wireless communication system, the RBS configured to handle data units received from a UE in stop-and-wait HARQ-process of a multi-carrier operation. The RBS comprises:
  A MAC-i/is receiver configured to receive a MAC-i/is data unit;

A TSN identifying unit configured to identify the Transmission Sequence Number, TSN, of a received MAC-i/is data unit, said TSN indicated only in a MAC-is header; and A determining unit configured to determine the original transmission order of two or more received MAC-i/is data units from an extended reordering depth, the extended reordering depth being increased compared to a reordering depth of a 6 bit TSN-field, and being based on the identified TSN of the received data units.

According to an eight aspect, the invention provides a radio base station, RBS, for a wireless communication system, the RBS configured to transmit data units to a UE in a stop-and-wait HARQ-process of a multi-carrier operation. The RBS comprises:

A TSN indicating unit configured to indicate the original transmission order of two or more MAC-ehs data units by using an extended reordering depth, the extended reordering depth being increased compared to the reordering depth of a 6 bit TSN-field, and being based on a TSN indicated only in a header of a MAC-ehs data unit, and A MAC-ehs transmitter configured to transmit MAC ehs data units.

The extended reordering depth may be further based on the identity of each cell a in multi-cell operation, on the identity of each MIMO-stream in MIMO-operation, or on the number of required retransmissions.

Alternatively, in the uplink, the TSN may be indicated in the 6 bit TSN field and in a TSN extension field that is adjacent to the TSN-field, and both fields are located in the MAC-is header of a MAC-i/is data unit. The TEN field and the adjacent TSN extension field may be further combined into on extended TSN field.

Alternatively, in the downlink, the TSN may be indicated in the 6-bit TSN field and in an octet-aligned TSN extension field, wherein both fields are located in the header of a MAC-ehs data unit, or only in an octet-aligned extended TSN field located in the header of a MAC-ehs data unit. Further, in the latter case, the presence of the extended TSN field may be indicated in the TSN field.

In the uplink, the MAC-i/is data unit comprises a MAC-i header and a MAC-is header, and the MAC-i header may be removed from the MAC i/is data unit in an RBS, and the remaining MAC-is data unit forwarded to a Radio Network Controller, RNC.

An advantage with embodiments of the present invention is that TSN reordering window stalling is avoided in multi-carrier operation, thereby enabling a continuous use of high data rates in a multi-cell or a MIMO-system.

BRIEF DESCRIPTION OF THE DRAWINGS

The present invention will now be described in more detail, and with reference to the accompanying drawings, in which.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to example scenarios. In particular, exemplary embodiments of the invention are described in a non-limiting general context in relation to a UTRAN. However, it should though be noted that embodiments of the invention may be applied to other types of radio access networks, e.g. to an E-UTRAN.

According to embodiments of this invention, a TSN reordering window stalling is avoided during a stop-and-wait HARQ-process of a multi-carrier operation in the downlink MAC-ehs protocol and in the uplink MAC-i/is protocol by an extended reordering depth. This extended reordering depth corresponds to a reordering depth that is increased from the 32 transmission sequence numbers obtained by a 6 bits TSN field, and it is based on the TSN of a data unit, said TSN being indicated only in the header of the data unit. A method performed in the MAC-ehs protocol, according to embodiments of the invention, is shown in the FIGS. 4 and 5, and a method performed in the MAC-i/is protocol, according to embodiments of the invention, is illustrated in the FIGS. 6 and 7.

Figure 4:
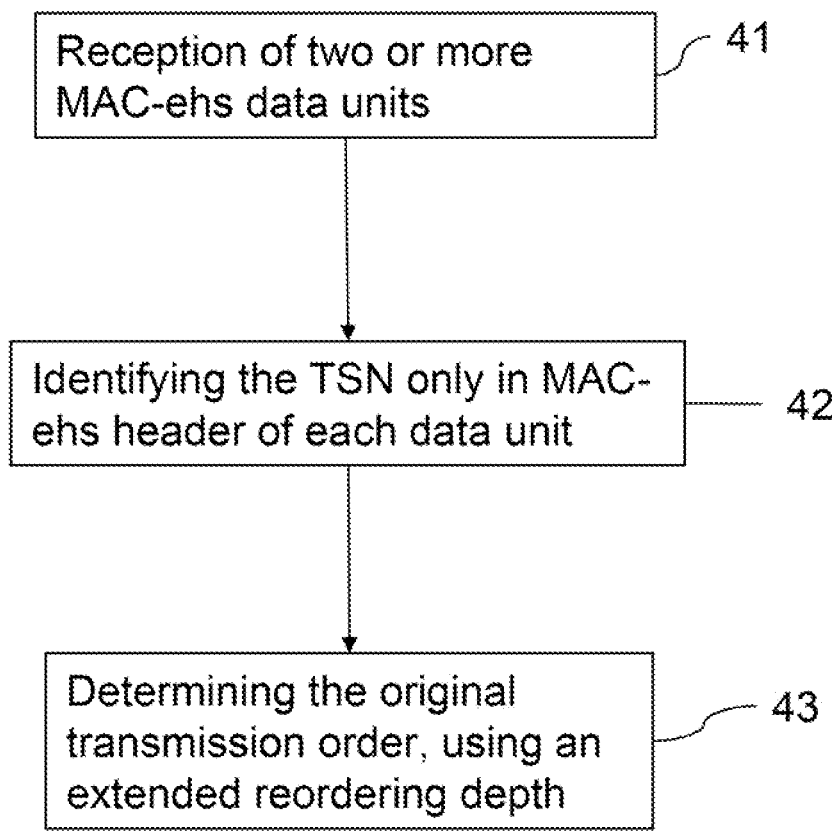
FIG. 4 is a flowchart of exemplary embodiments of the invention, as performed by a UE in the downlink.

FIG. 4 is a flowchart illustrating an exemplary embodiment of the invention, as performed by a UE in the downlink. In step 41, the UE receives two or more MAC-ehs data units, i.e. MAC-ehs PDU:s, from a RBS, e.g. a NodeB. Since the MAC-ehs protocol includes a HARQ functionality, the received data units may have been retransmitted several times by the RBS, before a correct decoding could take place. In order to determine the original transmission order of the received data units, and to deliver them in a correct order to higher layers, the UE identifies, in step 42, the TSN of each received MAC-ehs data unit, in which the entire TSN is indicated only in the MAc-ehs header. Thereafter, in step 43, the original transmission order is determined, using an extended reordering depth, which is based on said identified TSN. Said extended reordering depth corresponds to a reordering depth that is increased compared to the reordering depth obtained from a 6 bits TSN field.

Figure 5:
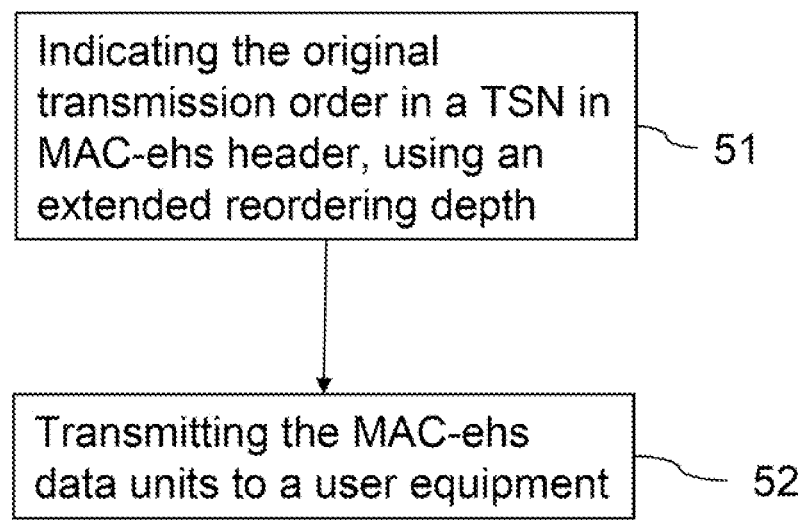
FIG. 5 is a flowchart of exemplary embodiments of the invention according to FIG. 4, as performed by the RBS.

FIG. 5 is a flowchart illustrating the exemplary embodiment of the invention according to FIG. 4, as performed by an RBS communicating with the UE. In step 51, the RBS indicates the original transmission order in a TSN, which is located only in the header of the MAC-ehs data unit, using an extended reordering depth, and in step 52, the RBS transmits the MAC-ehs data unit to the UE. The extended reordering depth is a reordering depth that is increased compared to the reordering depth obtained from a 6 bits TSN field.

Figure 6:
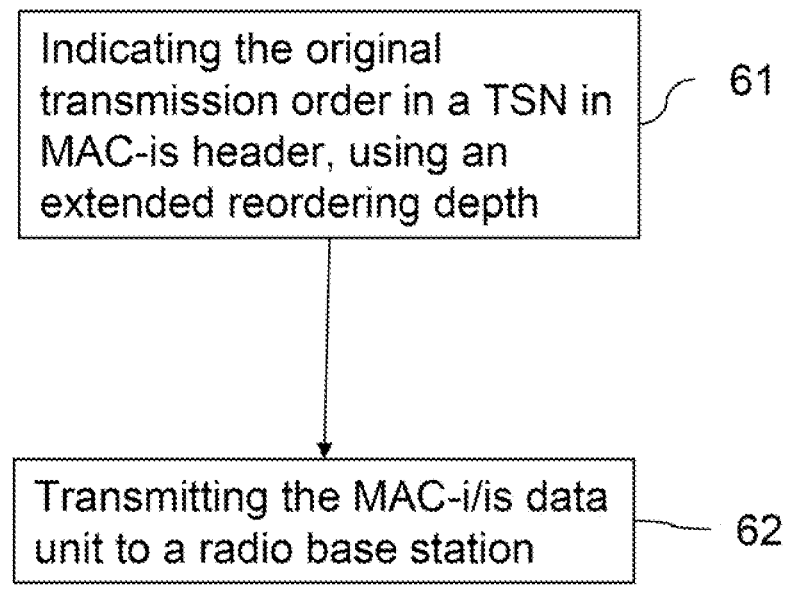
FIG. 6 is a flowchart of exemplary embodiments of the invention, as performed by a UE in the uplink.

FIG. 6 is a flowchart illustrating the exemplary embodiment of the invention, as performed by a UE according to the uplink MAC-i/is protocol. Since the MAC-i/is protocol also includes a HARP functionality, the UE may have to retransmit the data units several times, before a correct decoding could take place. Therefore, in step 61, the UE indicates the original transmission order in a TSN of the MAC-i/is data unit, the TSN located only in the MAC-is header of the data unit, using an extended reordering depth. The extended reordering depth is a reordering depth that is increased compared to the reordering depth obtained from a 6 bits TSN field. In step 62, the UE transmits the MAC-i/is data unit to a RBS, e.g. a NodeB of a UTRAN.

Figure 7:
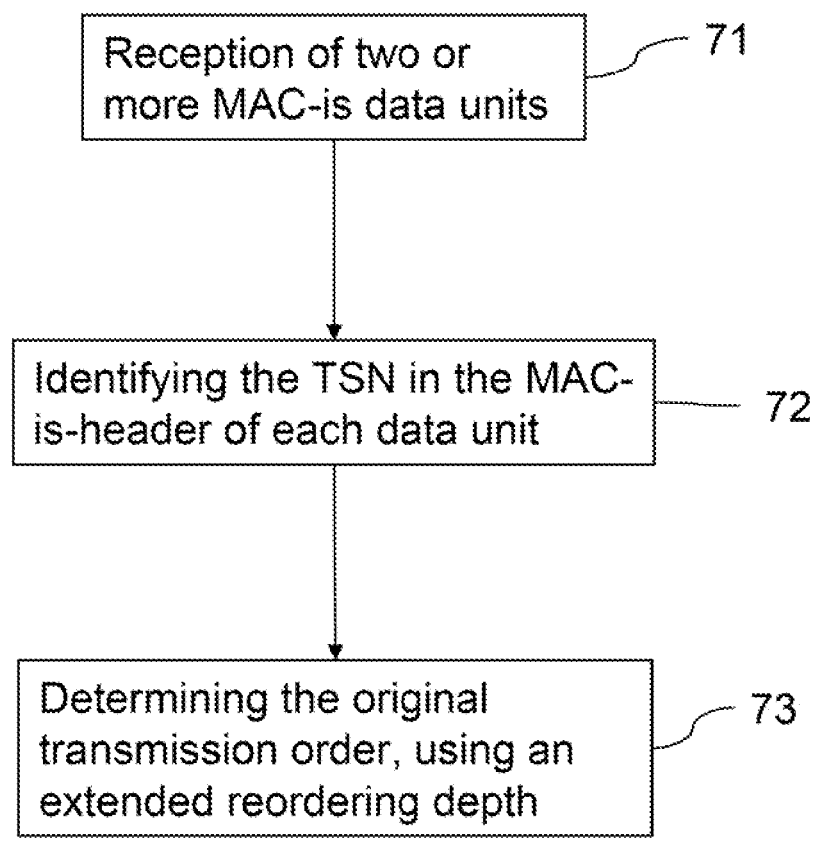
FIG. 7 is a flowchart of exemplary embodiments of the invention according to FIG. 6, as performed by the RBS.

FIG. 7 is a flowchart illustrating the exemplary embodiment of the invention according to FIG. 6, as performed by the RBS communicating with the UE. In step 71, the RBS receives two or more MAC-i/is data units from a UE. In order to determine the original transmission order of the received data units, and be able to deliver them in a correct order to higher layers, the RBS identifies, in step 72, the TSN of each received data unit, the entire TSN indicated only in the MAC-is header. Thereafter, in step 73, the original transmission order is determined, using an extended reordering depth, which is based on said identified TSN. This extended reordering depth is a reordering depth that is increased compared to the reordering depth obtained from a 6 bits TSN field.

Thus, the extended reordering depth is based on a TSN of a data unit, and this TSN is indicated only in the header of the data unit, according to different exemplary embodiments.

According to a first embodiment of the invention, the TSN field in the downlink MAC-ehs header, as well as the TSN field in the uplink MAC-is header, is unchanged from 6 bits, and the identity of the different cells is used to extend the reordering depth for indicating and determining a correct reordering sequence, i.e. the correct initial transmission order of the data units. This is achieved by the participating cells in a multi-cell operation transmitting MAC-ehs PDUs with a fixed order of the data from the different cells. Thereby, a MAC-ehs PDU received on a primary cell stream is reordered before a MAC-ehs PDU with the same TSN value in the header and received on a secondary cell stream. This corresponds to coding the least significant bit(s) of the TSN as a part of the cell in which the data is transmitted; e.g. if a Primary cell MAC-ehs TSN field=t, an extended TSN=t.1, a Secondary cell MAC-ehs extended TSN=t.2, and a Tertiary cell MAC-ehs extended TSN=t.3, and t.1<t.2<t.3. Thus, according to this embodiment, the extended reordering depth is based on a TSN indicated in a 6 bit TSN field located in the header, and further based on the identity of each cell. A corresponding indication and determining of the correct initial transmission order is performed in an MAC-i/is PDU.

According to a second embodiment of the invention, the TSN field in the downlink MAC-ehs header, as well as the TSN field in the uplink MAC-is header of a MAC-i/is data unit, is unchanged from 6 bits, similarly as in the first embodiment. However, in this second embodiment, the identity of the MIMO-stream is used to extend the reordering depth for indicating and determining the correct reordering sequence, i.e. the correct initial transmission order of the data units. In a MIMO operation, the different streams could transmit MAC-ehs PDUs with the same TSN value in the MAC-ehs header, but with a fixed order of the data from the different MIMO-stream. Thereby, a MAC-ehs PDU received on a primary MIMO stream is reordered before a MAC-ehs PDU received on a secondary MIMO stream, in case the TSN of the headers are the same. This corresponds to coding the least significant bit(s) of the TSN as a part of the MIMO-stream in which the data is transmitted, e.g. if a Primary MIMO-stream MAC-ehs TSN field=t.1, an extended TSN=t.2, a Secondary MIMO-stream MAC-ehs extended TSN=t.2, and a Tertiary MIMO-stream MAC-ehs extended TSN=t.3, and t.1<t.2<t.3. Thus, according to this embodiment, the extended reordering depth is based on a TSN indicated in a 6 bit TSN field located in the header, and further based on the identity of each MIMO-stream. A corresponding indication and determining of the correct initial transmission order is performed in a MAC-is header of a MAC-i/is PDU.

According to a third embodiment of the invention, the TSN field in the downlink MAC-ehs header, as well as the TSN field in the uplink MAC-is header, is unchanged from 6 bits. Instead, information about the required number of HARQ retransmissions before a correct decoding of reordered and received data unit could take place, is used to extend the TSN value for determining a correct reordering sequence, i.e. the initial original transmission order of received and reordered data units.

Figure 8:
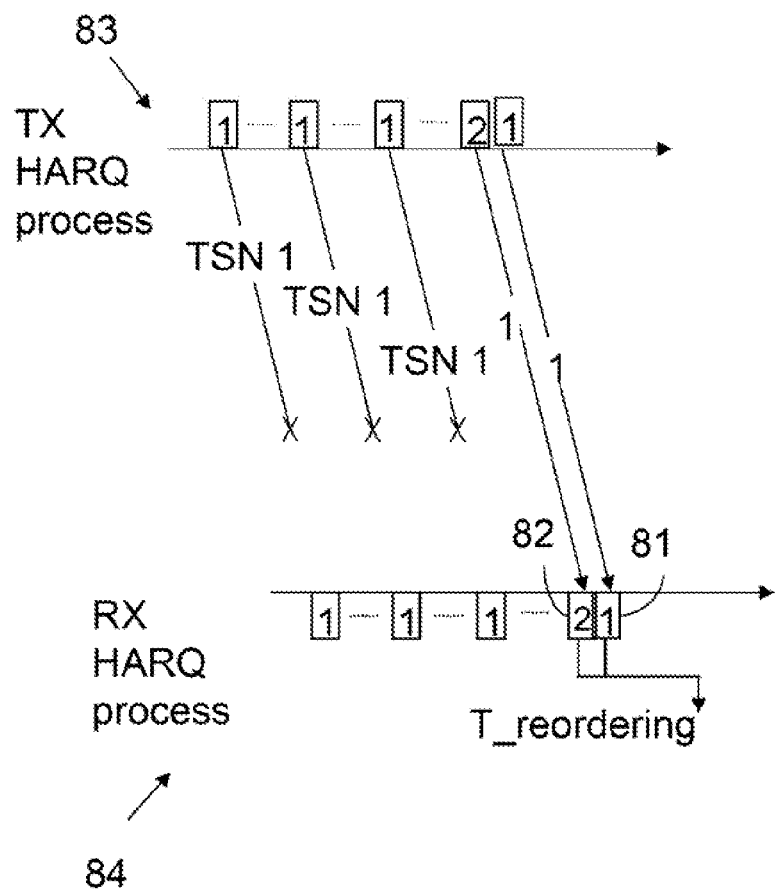
FIG. 8 is a schematic block diagram illustrating an exemplary embodiment of the invention, in which the extended reordering depth is based on the number of required retransmissions.

According to this embodiment, the UE and the RBS in a multi-cell and MIMO operation will receive MAC-ehs PDUs or MAC-i/is PDUs continuously, and the received PDUs could have the same TSN values in the header, but the correct initial sequence of the data is determined by HARQ history of the process, prior to a successful decoding of data. This third embodiment is illustrated in FIG. 8, showing a HARQ process of a MAC-ehs protocol, in which a receiver 84 reorders unsuccessfully received data units from a transmitter 83. A first MAC-ehs PDUs 81, indicated by 1 in the figure, and a second MAC-ehs PDU 82, indicated by 2 in the figure, both having the same TSN, are received in subsequent TTIs. The second MAC-ehs PDU 82 in the first TTI is received after successfully decoding the initial transmission, while the first MAC-ehs PDU 81 in the second TTI required successfully combining four retransmissions. According to this embodiment, the actual time of the original transmission is determined, based on the number of combined (re)transmissions, and the original transmission order of two or more received data unit is obtained. Thus, according to this embodiment, the extended reordering depth is based on a TSN indicated in a 6 bit TSN field located in the header, and further based on information about the required number of HARQ retransmissions.

According to this embodiment, a corresponding determination of the correct initial transmission order is performed by a RBS receiving a MAC-i/is PDU from a UE.

Further, in this third embodiment, the received MAC-ehs PDU could not be immediately delivered to the higher layers, since it exists subsequent TTIs with MAC-ehs PDUs that have to be delivered first. In order to achieve this, the delivery of a received MAC-ehs PDU has to be delayed. This delay can be implemented either as a fixed time interval, or by a timer (T_reordering) configurable by the network. As illustrated in FIG. 8, the PDU 81 of HARQ process No. 1 is delivered to higher layers before the PDU 82 of the HARQ process No. 2.

According to the above-described embodiments relating to the uplink MAC i/is protocol, a UE 13 transmits a MAC i/is PDU, which comprises both a MAC-i header and a MAC-is header, as well as a payload. In a RBS 14 (e.g. a NodeB), the MAC-i header is removed from the MAC-i/is PDU, and the remaining MAC-is PDU is forwarded to the RNC 15 (Radio Network Controller) of a UTRAN.

According to a fourth embodiment of the invention, the TSN field of the header in the downlink MAC-ehs protocol is increased from 6 bits by including a TSN extension field, which is also located in the MAC-ehs header. The TSN for determining and indicating the reordering sequence is obtained by combining the TSN of the TSN-field with the TSN of the TSN extension field. To avoid at least some of the disadvantages associated with the MAC-hs PDU format for 1.28 Mcps TDD multi-frequency HS-DSCH operation mode, the TSN extension field is placed at the end of the MAC-ehs header, instead of in the payload.

According to a further embodiment, the TSN extension field is octet aligned, and the presence of a TSN extension field is indicated by a special value in the LCH-ID-field. To convey to the real logical channel, the LCH-ID field may be repeated, e.g. after the TSN extension field. Preferably, the combined TSN extension field and the LCH-ID field is octet aligned, by a LCH-ID field having four bits, and a TSN-extension field having four bits+zero or more octets.

Figure 1:
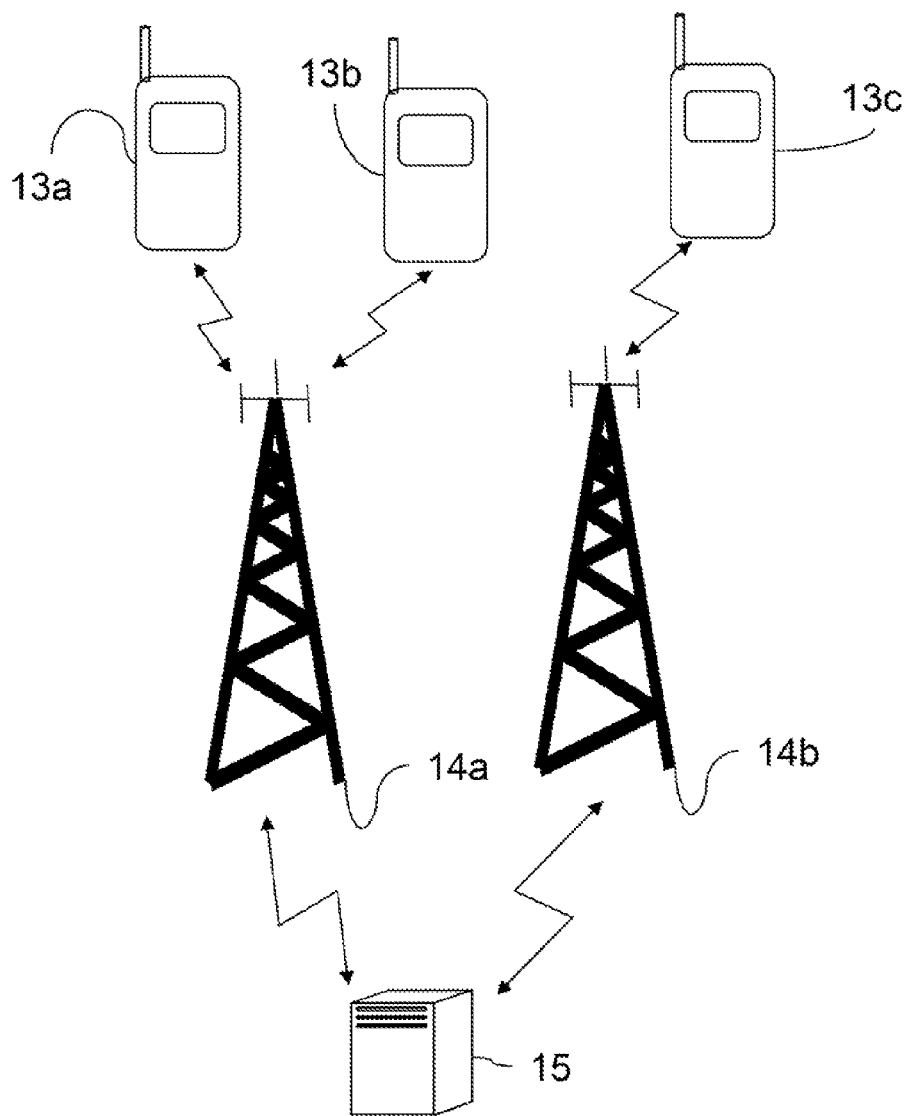
FIG. 1 is a schematic block diagram illustrating a UTRAN.
Figure 2:
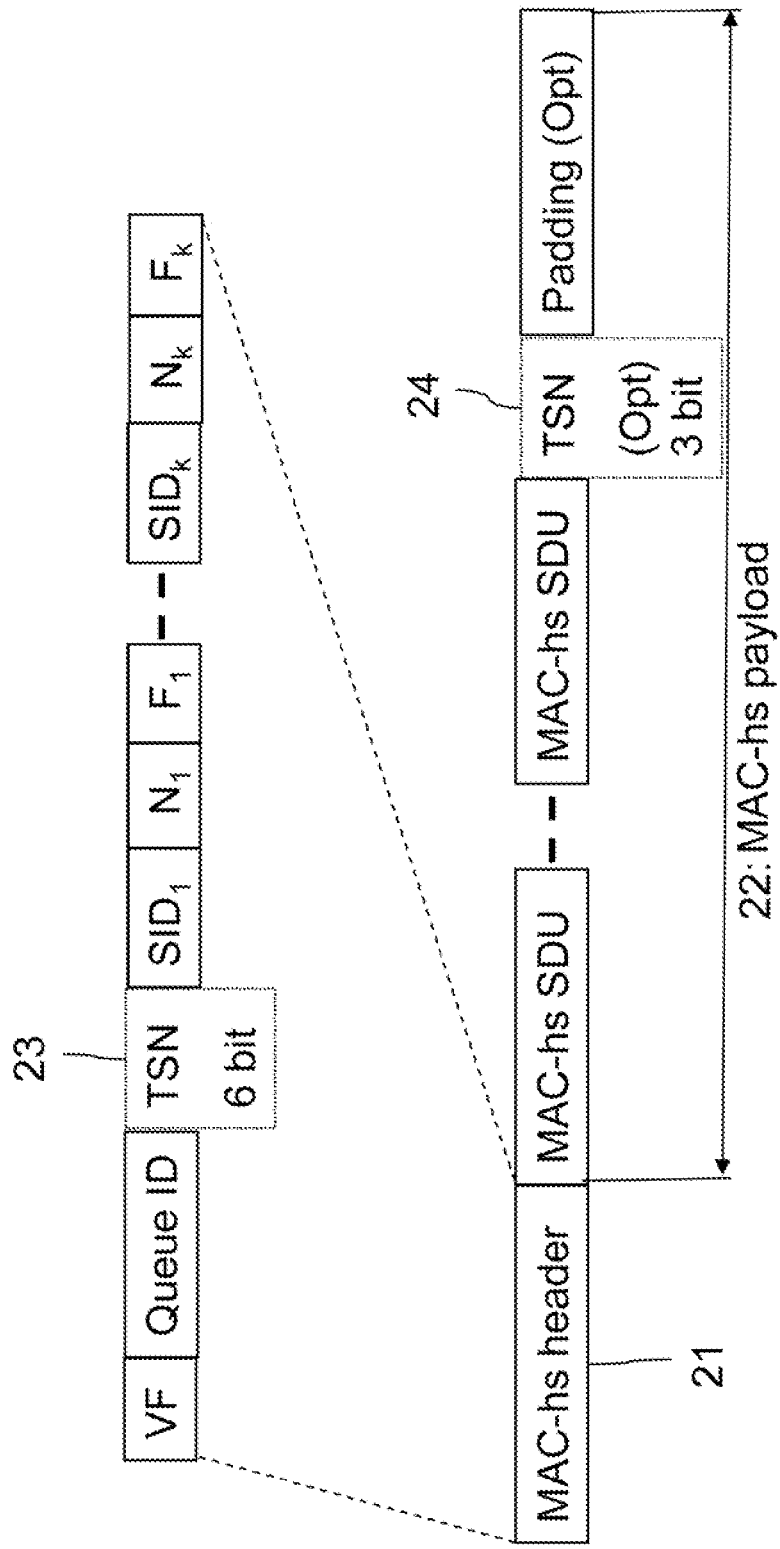
FIG. 2 is a schematic block diagram illustrating a conventional a MAC-hs PDU.
Figure 3:
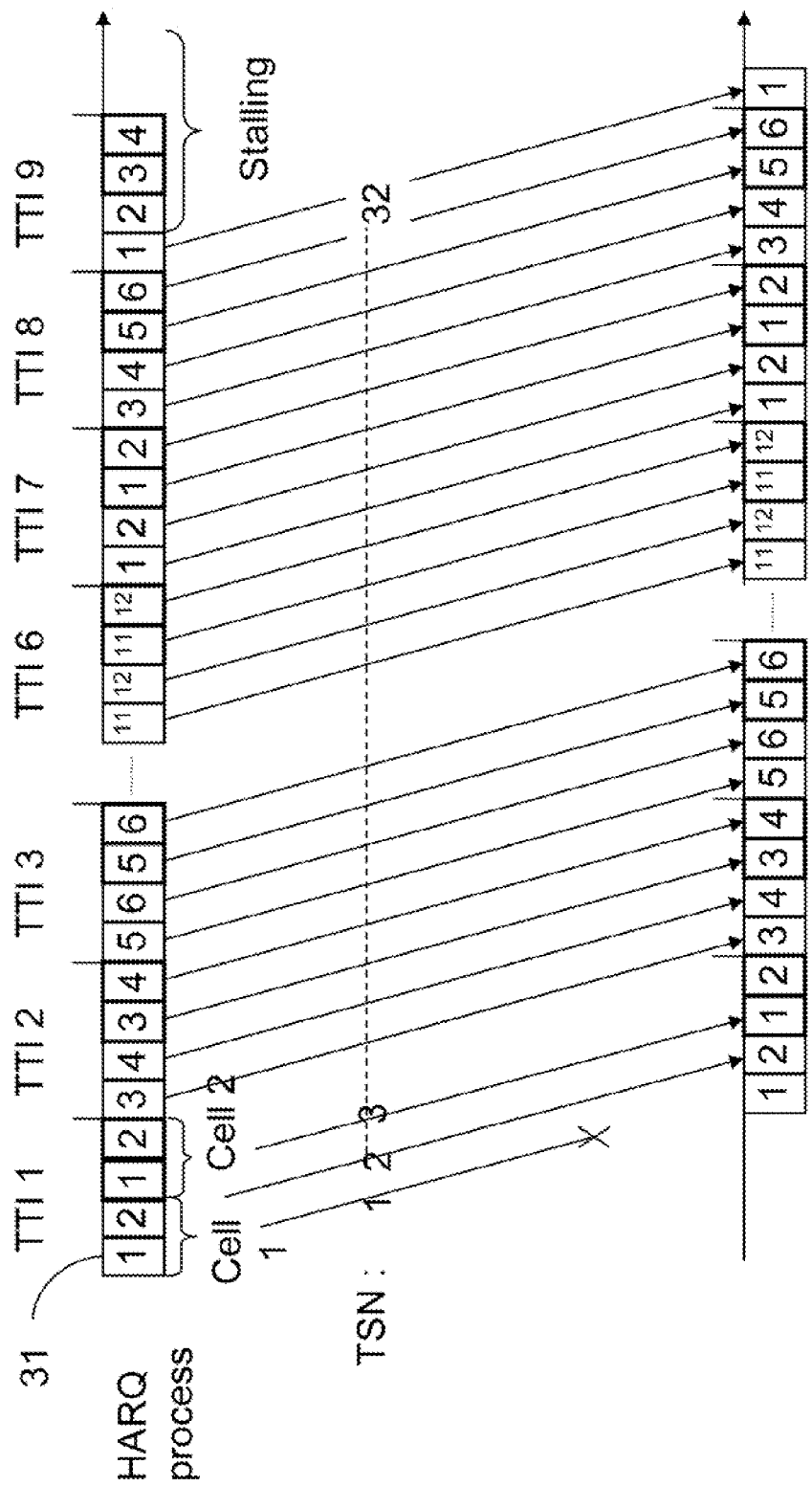
FIG. 3 is a schematic block diagram illustrating TSN reordering window stalling.
Figure 9:
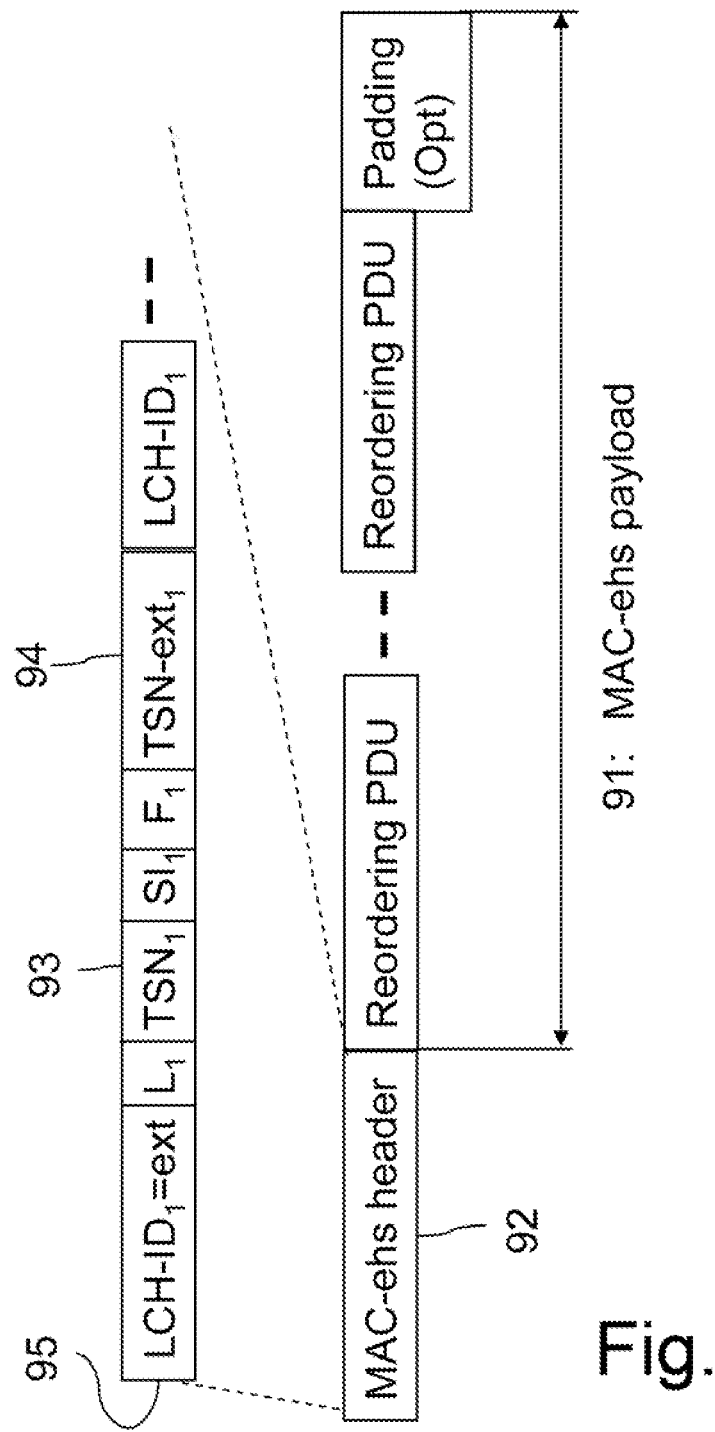
FIG. 9 is a schematic block diagram illustrating a MAC-ehs PDU, according to an exemplary embodiment of the invention, in which the extended reordering depth is based on a TSN indicated in the TSN-field and in an extended TSN-field.

An exemplary embodiment of a header format according to the fourth embodiment is shown in FIG. 9, illustrating a MAC-ehs header 92, comprising a 6 bit TSN-field 93 and a TSN extension field 94, as well as a LCH-ID field 95. Contrary to the MAC-hs PDU Protocol Data Unit for 1.28 Mcps TDD multi-frequency HS-DSCH operation mode, which is illustrated in FIG. 2, the TSN extension field is located in the MAC-ehs header, instead of in the MAC-ehs payload 91. However, the order of the TSN extension field and LCH-ID field is optional. Alternatively, a special value in any of the other fields (L, SI, F) is used to indicate the presence of the TSN-ext-field.

According to a fifth embodiment, the TSN field in the MAC-ehs protocol is increased from 6 bits by replacing the TSN field with an extended TSN field, such that the TSN for determining and indicating the reordering sequence is located only in this the extended TSN field, which is located in the header of the data unit. To avoid at least some of the disadvantages associated with the MAC-hs PDU format for 1.28 Mcps TDD multi-frequency HS-DSCH operation mode, and similarly as in the above described fourth embodiment, the extended TSN-field is located at the end of the MAC-ehs header, instead of in the payload.

According to a further embodiment, the presence of the extended TSN field is indicated by a special value in the TSN field, and the extended TSN field is octet aligned, i.e. comprising one or more octets.

Figure 10:
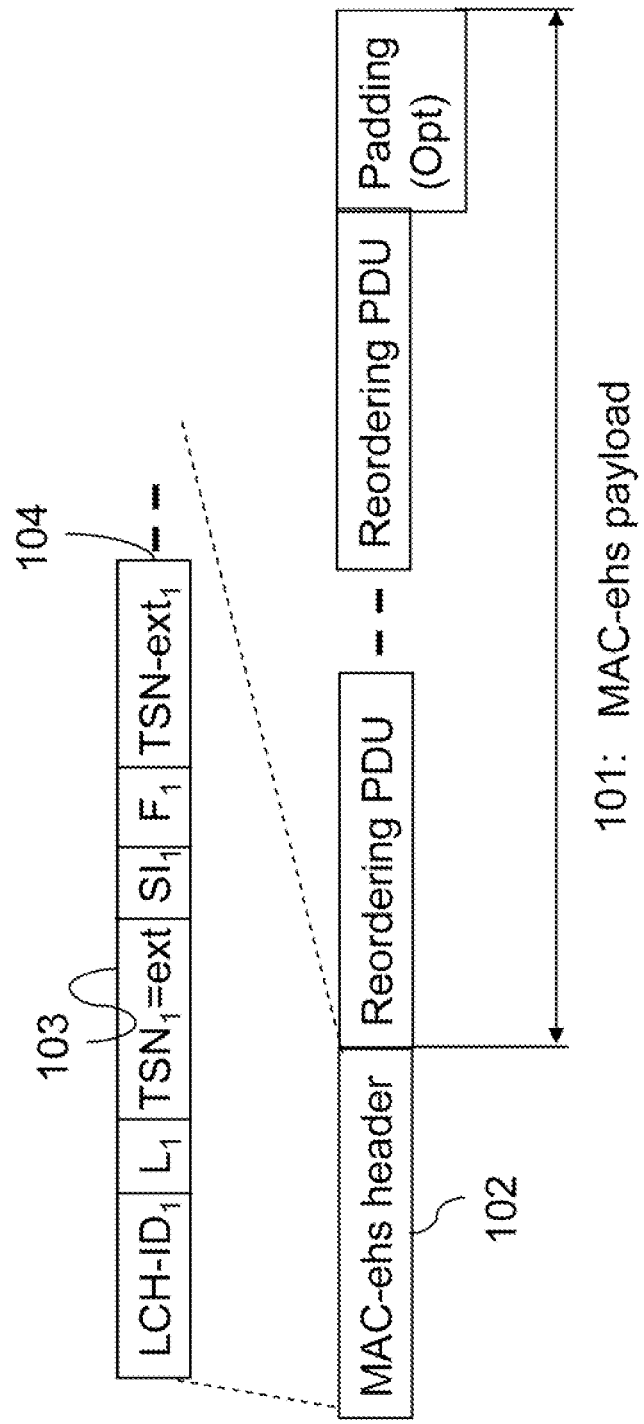
FIG. 10 is a schematic block diagram illustrating a MAC-ehs PDU, according to an exemplary embodiment of the invention, in which the extended reordering depth is based on a TSN indicated only in an extended TSN-field.

FIG. 10 illustrates an exemplary MAC-ehs PDU according to the fifth embodiment, comprising a MAC-ehs payload 101 and a MAC-ehs header 102 with an extended TSN field 104. The TSN for indicating and determining the reordering sequence is placed only in the extended TSN field, and the 6 bit TSN field 103 only indicates the presence of the extended TSN field.

The sixth embodiment relates to the uplink MAC-i/is protocol corresponding to the above-described fourth embodiment. Accordingly, the TSN field of the header in the MAC-is PDU is increased from 6 bits by including a TSN extension field, which is also located in the MAC-is header, adjacent to the TSN field. The TSN for determining and indicating the reordering sequence is obtained by combining the TSN of the TSN field with the TSN of the TSN extension field.

According to a further embodiment, the presence of the TSN extension field is indicated by a special value in the LCH-ID-field of the MAC-i header.

Figure 11:
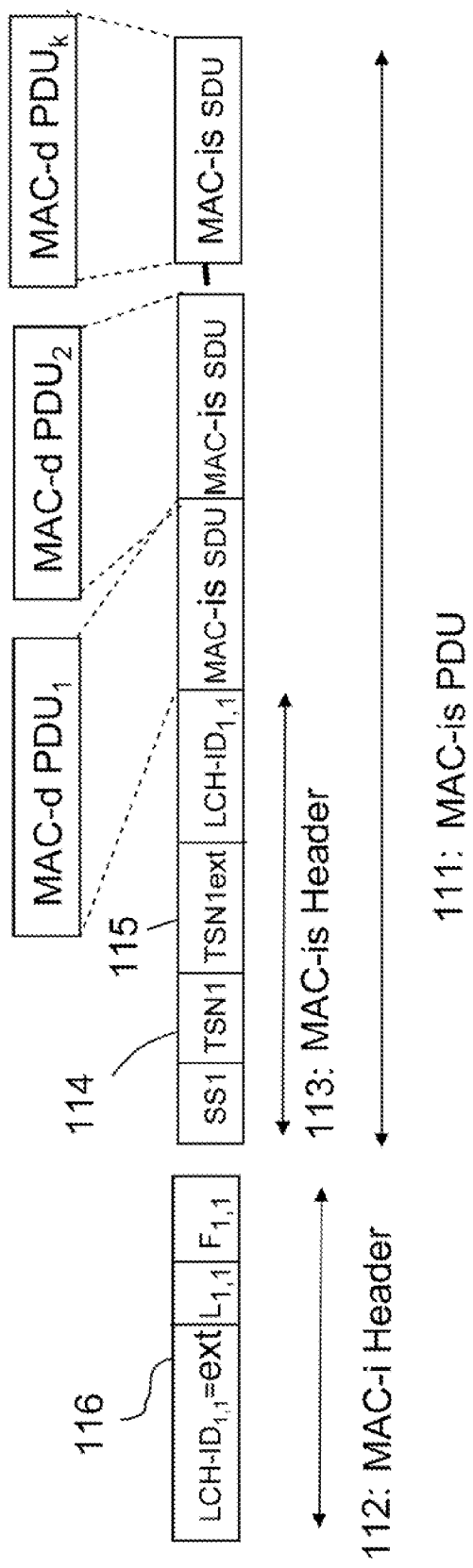
FIG. 11 is a schematic block diagram illustrating a MAC-i/is PDU, according to an exemplary embodiment of the invention, in which the extended reordering depth is based on a TSN indicated in the TSN-field and in an adjacent extended TSN-field, both located in the MAC-is header.

FIG. 11 illustrates an exemplary MAC i/is PDU, according to the sixth embodiment, showing a MAC-i header 112, as well as the MAC-is PDU 111 comprising a MAC-is header 113. The MAC-is header comprises a TSN-field 114 and an adjacent TSN extension field 115, and the MAC-i header 112 comprises a LCH-ID field 116 indicating the presence of a TSN extension field.

The seventh embodiment relates to the uplink MAC-i/is protocol corresponding to the above-described fifth embodiment. Accordingly, the TSN field of the header in the MAC-is PDU is extended by an extended TSN field. The TSN for determining and indicating the original transmission order of the data unit is located only in this the extended TSN field. The extended TSN field is located adjacent to the TSN field, and both are located in the MAC-is header.

According to a further embodiment, the presence of the TSN extension field is indicated by a special value in the LCH-ID-field of the MAC-i header, as well as by a special value in the TSN field.

Figure 12:
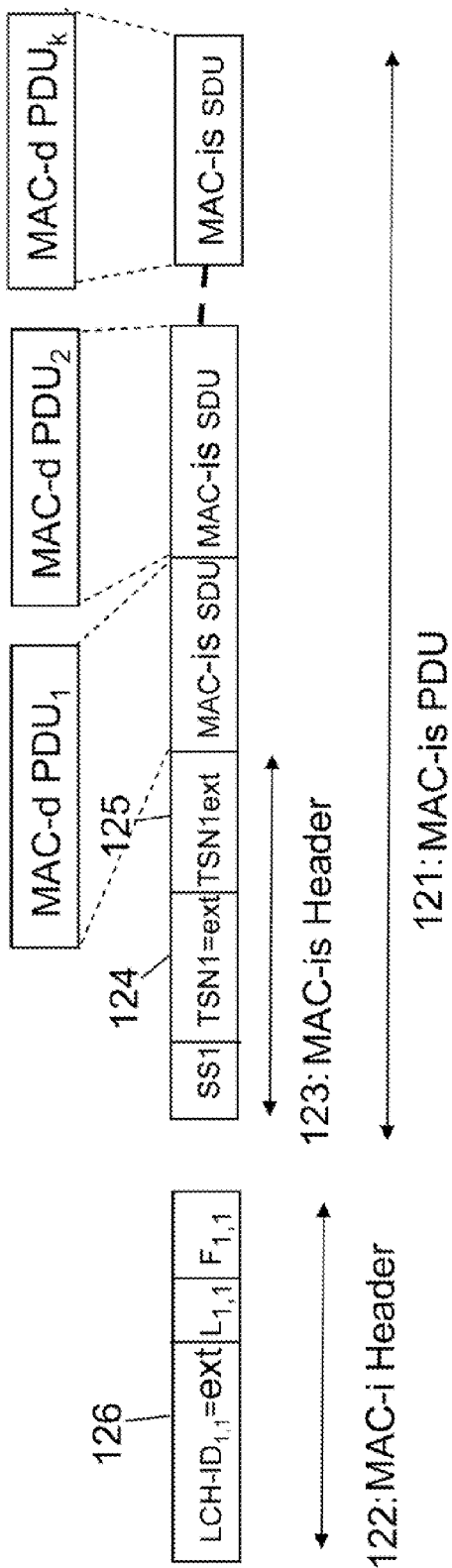
FIG. 12 is a schematic block diagram illustrating a MAC-i/is PDU, according to an exemplary embodiment of the invention, in which the extended reordering depth is based on a TSN indicated only in an extended TSN-field, which is located in the MAC-is header, and adjacent to the TSN field.

FIG. 12 illustrates an exemplary MAC i/is PDU, according to the seventh embodiment, showing a MAC-i header 122, as well as the MAC-is PDU 121 comprising a MAC-is header 123. The MAC-is header comprises a TSN-field 124 and an adjacent TSN extension field 125, and the MAC-i header 122 comprises a LCH-ID field 126, indicating the presence of a TSN extension field.

According to the above-described sixth and seventh embodiments, which both are related to the uplink MAC i/is protocol, a UE 13 transmits a MAC i/is PDU comprising both a MAC-i header and a MAC-is header, as well as a payload. In the RBS 14 (i.e. NodeB), the MAC-i header is removed from the MAC-i/is PDU, and the remaining MAC-is PDU is forwarded to the RNC (Radio Network Controller) 15 of the UTRAN.

Thus, according to the fourth, fifth, sixth and seventh embodiments described above, the extended reordering depth is based on a TSN indicated by more than 6 bits, either in a 6 bit TSN field, combined with a TSN extension field, or in an extended TSN field comprising more than 6 bits. However, the fields are all located only in a header of a data unit.

Figure 13:
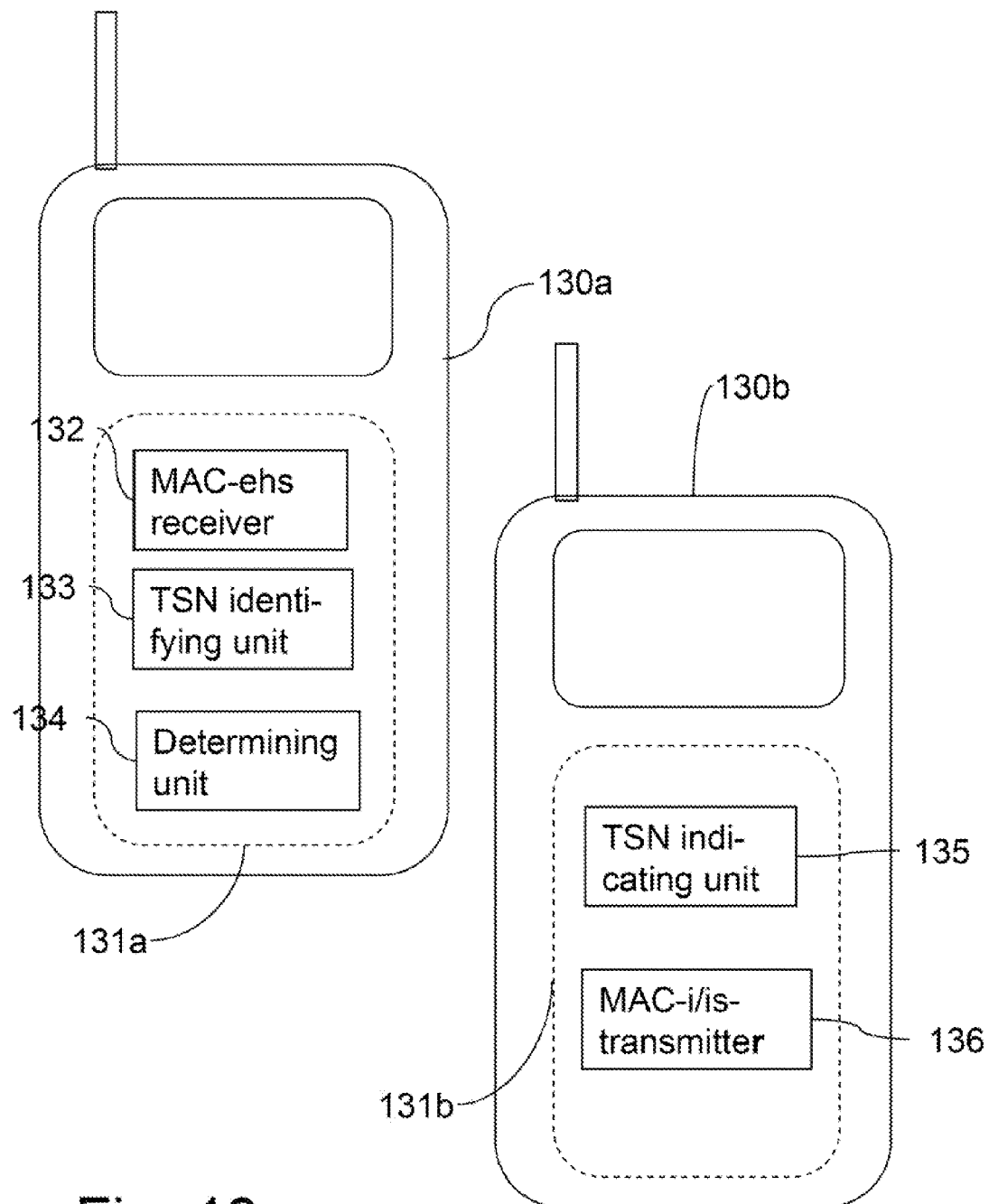
FIG. 13 is a schematic block diagram illustrating two UEs, according to embodiments of this invention.

FIG. 13 illustrates two UEs, a first exemplary UE 130a and a second exemplary UE, according to embodiments of this invention. The illustrated UEs are User Equipments, e.g.

mobile phones, comprising a transmitter and a receiver for wireless communication with a serving radio base station, as well as a suitable user interface and processing means.

The first UE 130a is configured to handle MAC-ehs data units received from a radio base station in a HARQ process, using a downlink entity 131a. This downlink entity comprises a MAC-ehs receiver 132 for receiving MAC-ehs PDUs, and a TSN identifying unit 133 for identifying the TSN (transmission sequence number) of a received PDU, i.e. the TSN indicated only in the header of the data unit. Further, the downlink entity comprises a determining unit 134 for determining the original transmission order of two or more received data units. This transmission order is determined from an extended reordering depth, which corresponds to a reordering depth that is increased compared to the reordering depth, i.e. sequence number, indicated in a conventional 6 bit TSN field. The extended reordering depth is based on the TSN indicated only in a MAC-ehs header.

According to embodiments of the invention, the determining unit 134 is further configured to base the extended reordering depth on the identity of each cell in multi-cell operation, on the identity of each MIMO-stream in MIMO-operation, or on the number of required retransmissions before a correct decoding could take place. These embodiments corresponds to the first, second and third embodiments, respectively, as described above.

Alternatively, the determining unit is configured to base the extended reordering depth only on the TSN indicated in the MAC-ehs header, i.e. in the 6 bit TSN field, as well as in a TSN extension field, which is also located in the MAC-ehs header. According to a further embodiment, the TSN is indicated only in the TSN extension field, as described above, in connection with the fourth and fifth embodiments.

The second UE 130b is configured to transmit MAC-i/is data units to a radio base station in a HARQ process, using an uplink entity 131b. This entity comprises a TSN indicating unit 135, and a MAC-i/is transmitter 136. The TSN indicating unit 135 is configured to indicate the original transmission order of a data unit, before the transmission, and this original transmission order is indicated according to an extended reordering depth. The extended reordering depth is increased compared to the reordering depth, i.e. sequence number, indicated in a conventional 6 bit TSN field, and is based on the TSN indicated only in a MAC-is header of a MAC-i/is PDU.

According to embodiments of the invention, the TSN indicating unit 135 is further configured to base the extended reordering depth on the identity of each cell in multi-cell operation, or on the identity of each MIMO-stream in MIMO-operation. These embodiments corresponds to the first and second embodiments, respectively, as described above.

Alternatively, the TSN indicating unit is configured to base the extended reordering depth only on the TSN indicated in the MAC-is header, i.e. in the 6 bit TSN field, as well as in a TSN extension field, which is also located in the MAC-is header, adjacent to the TSN field. According to a further embodiment, the entire TSN is indicated only in the TSN extension field, as described above, in connection with the sixth and seventh embodiments.

Figure 14:
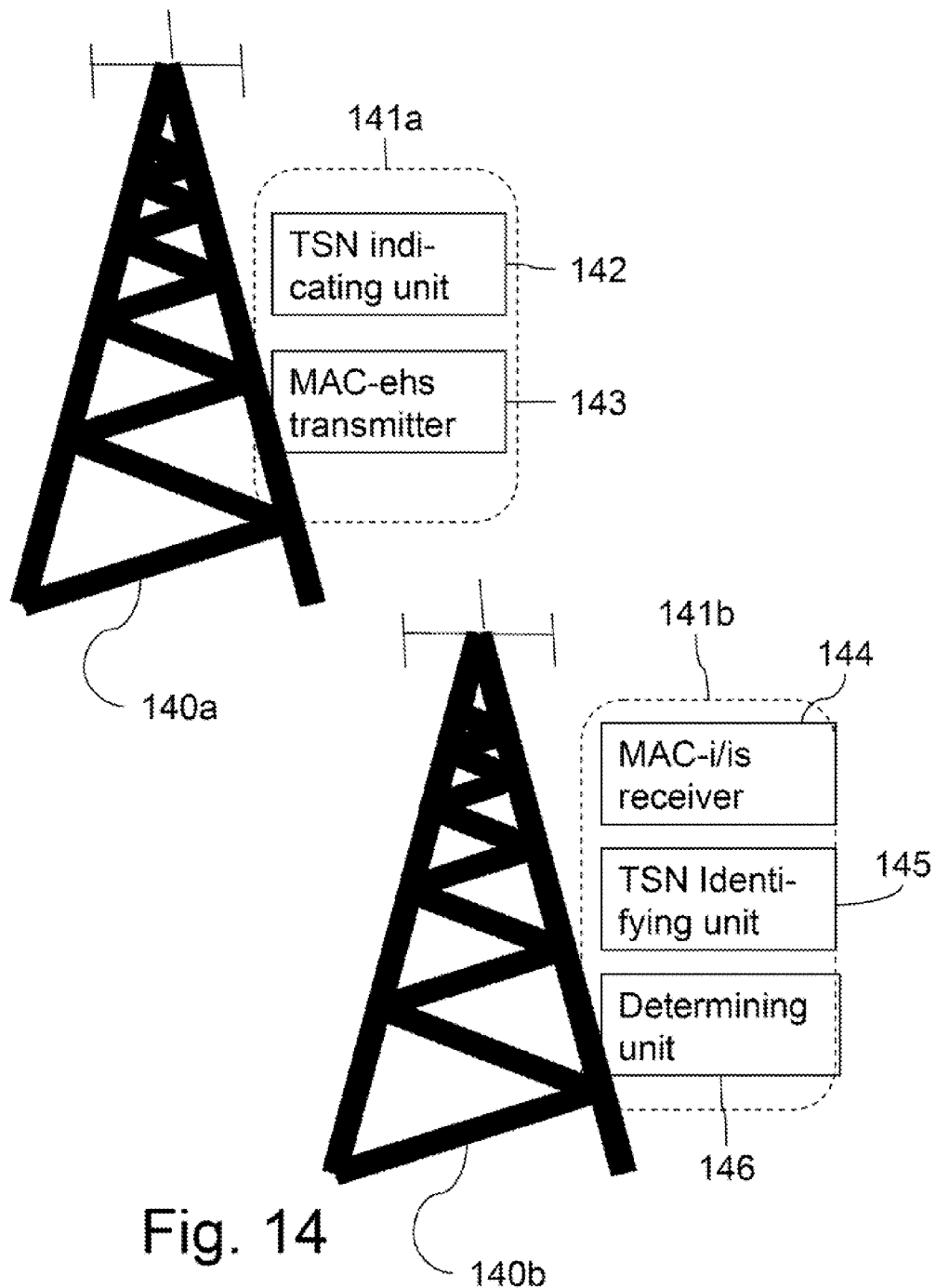
FIG. 14 is a schematic block diagram illustrating two radio base stations, e.g. NodeBs, according to embodiments of this invention.

FIG. 14 illustrates two RBSs, i.e. a first exemplary RBS 140a and a second exemplary RBS 140b, according to embodiments of this invention.

The illustrated RBSs are radio base stations, such as e.g. NodeBs of a UTRAN, provided with suitable wireless transmitters and receivers for wireless communication with UEs served by the NodeB, as well as with a Radio Network Controller, RNC, of a UTRAN. The RBS is also provided with appropriate processing means.

The first RBS 140a is configured to transmit MAC-ehs data units to a UE in a HARQ process, using a downlink entity 141a. This entity comprises a TSN indicating unit 142, and a MAC-ehs transmitter 143. The TSN indicating unit 142 is configured to indicate the original transmission order of a data unit before transmitting it to the UE, and this original transmission order is indicated in a data unit according to an extended reordering depth. The extended reordering depth is increased compared to the reordering depth, i.e. sequence number, indicated in a conventional 6 bit TSN field of a MAC-ehs data unit, and is based on the TSN indicated only in the MAC-ehs header of the MAC-ehs PDU.

According to embodiments of the invention, the TSN indication unit 142 is further configured to base the extended reordering depth on the identity of each cell in multi-cell operation, or on the identity of each MIMO-stream in MIMO-operation. These embodiments corresponds to the first and second embodiments, respectively, as described in more detail above.

Alternatively, the TSN indicating unit is configured to base the extended reordering depth only on the TSN of the MAC-ehs header, i.e. in the 6 bit TSN field, as well as in a TSN extension field, which is also located in the MAC-is header. According to a further embodiment, the entire TSN is indicated only in the TSN extension field, as described in more detail above in connection with the fourth and fifth embodiments.

The second RBS 140b is configured to handle MAC-i/is data units received from a UE in a HARQ process using an uplink entity 141b. This uplink entity comprises a MAC-i/is receiver 144 for receiving MAC-i/is PDUs, and a TSN identifying unit 145 for identifying the TSN (transmission sequence number) of a received PDU, i.e. the TSN indicated only in the header of the data unit. Further, the uplink entity comprises a determining unit 146 for determining the original transmission order of two or more received data units. This original transmission order is determined from an extended reordering depth, which corresponds to a reordering depth that is increased compared to the reordering depth, i.e. sequence number, indicated in a conventional 6 bit TSN field of a MAC-is header. The extended reordering depth is based on the TSN indicated only in an MAC-is header of a received MAC-i/is PDU.

According to embodiments of the invention, the determining unit 146 is further configured to base the extended reordering depth on the identity of each cell in a multi-cell operation, on the identity of each MIMO-stream in MIMO-operation, or on the number of required retransmissions before a correct decoding of a received content could take place. These embodiments corresponds to the first, second and third embodiments, respectively, as described in more detail above.

Alternatively, the determining unit is configured to base the extended reordering depth on the TSN indicated only in the MAC-is header, i.e. in the 6 bit TSN field, as well as in a TSN extension field adjacent to the TSN field, both fields located in the MAC-is header. According to a further embodiment, the entire TSN is indicated only in the TSN extension field, as described above, in connection with the sixth and seventh embodiments.

According to a further embodiment, the determining unit is arranged to remove the MAC-i header from the MAC-i/is PDU, and forward the remaining MAC-is PDU to the RNC 15 (Radio Network Controller) of a UTRAN.

The entities and units described above with reference to FIGS. 13 and 14 are logical units, and do not necessarily correspond to separate physical units. Thus, the person skilled in the art would appreciate that the units disclosed in the FIGS. 13 and 14 may be implemented as physically integrated units, and/or physically separate units, and that the units may be provided with appropriate processing circuits.

Furthermore, the above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

MAC=Medium Access Control
TSN=Transmission Sequence Number
TTI=Transmission Time Interval
PDU=Protocol Data Unit
RBS—Radio Base Station
UE=User Equipment
HARQ=Hybrid Automatic Repeat Request
FEC=Forward Error Correction
ED=Error Detection
CLC=Cyclic Redundancy Check

The invention claimed is:

1. A method in a radio base station of a wireless communication system for handling received data units of a stop-and-wait HARQ-process in a multi-carrier operation, the method comprising the steps of:
   receiving two or more MAC-i/is data units from a user equipment;
   identifying the Transmission Sequence Number, TSN, of each of the received MAC-i/is data units, said TSN being indicated only in a MAC-is header, and,
   determining the original transmission order of said two or more received data units using an extended reordering depth, the extended reordering depth being increased compared to the reordering depth of a 6 bit TSN-field, and being based on said identified TSN;
      wherein the extended reordering depth is further based on the identity of each cell in multi-cell operation, on the identity of each MIMO-stream in MIMO-operation, or on the number of required retransmissions.

2. The method according to claim 1, wherein the TSN is indicated in the 6 bit TSN field and in a TSN extension field that is adjacent to the TSN-field, both fields being located in the MAC-is header of a MAC-i/is data unit.

3. The method according to claim 2, wherein the TSN field and the adjacent TSN extension field are combined into on extended TSN field, and the presence of the extended TSN field is indicated in the TSN field.

4. The method according to claim 1, wherein a MAC-i/is data unit comprises a MAC-i header and a MAC-is header, the method further comprising the steps of
   removing the MAC-i header from the MAC i/is data unit; and,
   forwarding the remaining MAC-is data unit to a Radio Network Controller (RNC).

5. A method in a radio base station of a wireless communication system for transmitting data units in a stop-and-wait HARQ-process of a multi-carrier operation, the method comprising the steps of:
   indicating a Transmission Sequence Number, TSN, only in a header of two or more MAC-ehs data units, wherein the original transmission order of the two or more data units is indicated by an extended reordering depth, the extended reordering depth being increased compared to the reordering depth of a 6 bit TSN-field, and being based on the indicated TSN; and,
   transmitting the MAC-ehs data units to a user equipment;
      wherein in multi-cell operation, the extended reordering depth is further based on the identity of each cell or on the identity of each MIMO-stream.

6. The method according to claim 5, wherein the TSN is indicated in a 6 bit TSN field and in an octet-aligned TSN extension field, both fields being located in the header of a MAC-ehs data unit.

7. The method according to claim 5, wherein the TSN is indicated only in an octet-aligned extended TSN field located in the header of the MAC-ehs data unit, the presence of the extended TSN field indicated in the TSN field.

8. A radio base station (RBS) for a wireless communication system, the RBS configured to handle data units received from a User Equipment (UE) in stop-and-wait HARQ-process of a multi-carrier operation, the RBS comprising:
   a MAC-i/is receiver configured to receive a MAC-i/is data unit;
   a TSN identifying unit configured to identify the Transmission Sequence Number, TSN, of a received MAC-i/is data unit, said TSN indicated only in a MAC-is header; and,
   a determining unit configured to determine the original transmission order of two or more received MAC-i/is data units from an extended reordering depth, the extended reordering depth being increased compared to a reordering depth of a 6 bit TSN-field, and being based on the identified TSN of the received data units;
      wherein the extended reordering depth is further based on the identity of each cell in multi-cell operation, on the identity of each MIMO-stream in MIMO-operation, or on the number of required retransmissions.

9. The RBS according to claim 8, wherein the TSN is indicated in the 6 bit TSN field and in a TSN extension field that is adjacent to the TSN-field, both fields being located in the MAC-is header of a MAC-i/is data unit.

10. The RBS according to claim 8, wherein a MAC-i/is data unit comprises a MAC-i header and a MAC-is header, and the RBS is further configured to remove the MAC-i header from the MAC i/is data unit, and forward the remaining MAC-is data unit to a Radio Network Controller, RNC.

11. A radio base station (RBS) for a wireless communication system, the RBS configured to transmit data units to a User Equipment (UE) in a stop-and-wait HARQ-process of a multi-carrier operation, the RBS comprising:
   a TSN indicating unit configured to indicate the original transmission order of two or more MAC-ehs data units by using an extended reordering depth, the extended reordering depth being increased compared to the reordering depth of a 6 bit TSN-field, and being based on a TSN indicated only in a header of a MAC-ehs data unit; and,
   a MAC-ehs transmitter configured to transmit MAC ehs data units;
      wherein the extended reordering depth is further based on the identity of each cell in multi-cell operation or on the identity of each MIMO-stream in MIMO-operation.

12. The RBS according to claim 11, wherein the TSN is indicated in the 6 bit TSN field and in a TSN extension field, both fields being located in the MAC-ehs header.

* * * * *